US010754499B2

(12) United States Patent
Yamagiwa et al.

(10) Patent No.: US 10,754,499 B2
(45) Date of Patent: Aug. 25, 2020

(54) PROGRAM AND INFORMATION PROCESSING APPARATUS FOR CHANGING A VIEWPOINT SELECTION MODE

(71) Applicant: Sony Interactive Entertainment Inc., Tokyo (JP)

(72) Inventors: Masaaki Yamagiwa, Tokyo (JP); Teruyuki Toriyama, Tokyo (JP); Hidetaka Miyazaki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/376,062

(22) Filed: Apr. 5, 2019

(65) Prior Publication Data

US 2019/0346989 A1 Nov. 14, 2019

(30) Foreign Application Priority Data

May 11, 2018 (JP) ................................ 2018-092245

(51) Int. Cl.
*G06F 3/0481* (2013.01)
*G06T 15/20* (2011.01)
(Continued)

(52) U.S. Cl.
CPC ..... *G06F 3/04815* (2013.01); *G06K 9/00664* (2013.01); *G06T 15/205* (2013.01); *G06T 19/003* (2013.01); *G06T 19/006* (2013.01)

(58) Field of Classification Search
None
See application file for complete search history.

(56) References Cited

U.S. PATENT DOCUMENTS 8,626,434 B1 * 1/2014 Kornmann ......... G01C 21/3638 345/625
9,199,166 B2 * 12/2015 Nakada .................. A63F 13/21
(Continued)

FOREIGN PATENT DOCUMENTS

| | | |
|---|---|---|
| JP | 11-161815 A | 6/1999 |
| JP | 2016-162426 A | 9/2016 |
| WO | 2016/157523 A1 | 10/2016 |

OTHER PUBLICATIONS

Japanese Notice of Reasons for Refusal dated Jun. 30, 2020, for the Corresponding Japanese Patent Application No. 2018-092245.

*Primary Examiner* — Jason A Pringle-Parker
(74) *Attorney, Agent, or Firm* — Katten Muchin Roseman LLP

(57) ABSTRACT

A program for causing a computer to execute: receiving an instruction to change a position and a direction of a viewpoint disposed in a virtual space from a user; controlling a viewpoint to change the position and the direction of the viewpoint in response to the instruction; rendering a spatial image that depicts an aspect of an interior of the virtual space on the basis of the position and the direction of the viewpoint; and switching over between a first mode of changing the direction of the viewpoint about the position of the viewpoint and a second mode of changing the position and the direction of the viewpoint about an object of interest to which the user pays attention in the virtual space in a case of receiving an instruction to change the direction of the viewpoint from the user at a time of controlling the viewpoint.

7 Claims, 6 Drawing Sheets

10
20
40
30

(51) Int. Cl.
*G06K 9/00* (2006.01)
*G06T 19/00* (2011.01)

(56) References Cited

U.S. PATENT DOCUMENTS

| | | | | |
|---|---|---|---|---|
| 2004/0001110 | A1* | 1/2004 | Khan .................. | G06F 3/04815 715/848 |
| 2007/0270215 | A1* | 11/2007 | Miyamoto .............. | A63F 13/10 463/32 |
| 2009/0181736 | A1* | 7/2009 | Haigh-Hutchinson ...................... | A63F 13/10 463/2 |
| 2015/0130801 | A1* | 5/2015 | Wooley .................. | H04N 5/232 345/420 |

* cited by examiner

PROGRAM AND INFORMATION PROCESSING APPARATUS FOR CHANGING A VIEWPOINT SELECTION MODE

BACKGROUND

The present technology relates to a program, an information processing apparatus, and an information processing method for rendering an image that depicts an aspect of an interior of a virtual space.

In a computer game, various objects are disposed in a virtual space, an image that depicts an aspect of disposing the objects is rendered, and the image is presented to a user. According to such a technique, the aspect of viewing the virtual space from a viewpoint position set in the virtual space to a given visual line direction is rendered. Changing this viewpoint position and the visual line direction in response to a user's instruction enables user to view the aspect of the virtual space with presence as if the user actually moved around in the virtual space.

According to the conventional technique described above, the user changes the position and the direction of a viewpoint by issuing an operation instruction or the like to an operation device; however, the user is not always able to change the position and the direction of the viewpoint as the user desires. Owing to this, the user is possibly confused whether the user grasps where the user is currently facing or possibly loses track of an object of interest in the virtual space.

SUMMARY

The present technology has been achieved in the light of the above circumstances and it is desirable to provide a program, an information processing apparatus, and an information processing method that can prevent a user from losing track of an object of interest in a virtual space.

A program according to the present technology is a program for causing a computer to execute: receiving step of receiving an instruction to change a position and a direction of a viewpoint disposed in a virtual space from a user; controlling a viewpoint to change the position and the direction of the viewpoint in response to the instruction; rendering a spatial image that depicts an aspect of an interior of the virtual space on a basis of the position and the direction of the viewpoint; and switching over between a first mode of changing the direction of the viewpoint about the position of the viewpoint and a second mode of changing the position and the direction of the viewpoint about an object of interest to which the user pays attention in the virtual space on a basis of a given condition in a case of receiving an instruction to change the direction of the viewpoint from the user in the viewpoint control step. This program may be stored in a computer readable non-transitory storage medium and provided.

An information processing apparatus according to the present technology is an information processing apparatus including: an instruction receiving section that receives an instruction to change a position and a direction of a viewpoint disposed in a virtual space from a user; a viewpoint control section that changes the position and the direction of the viewpoint in response to the instruction; and a spatial image rendering section that renders a spatial image that depicts an aspect of an interior of the virtual space on a basis of the position and the direction of the viewpoint, in which the viewpoint control section switches over between a first mode of changing the direction of the viewpoint about the position of the viewpoint and a second mode of changing the position and the direction of the viewpoint about an object of interest to which the user pays attention in the virtual space on the basis of a given condition in a case in which the instruction receiving section receives an instruction to change the direction of the viewpoint from the user.

An information processing method according to the present technology is an information processing method including: receiving an instruction to change a position and a direction of a viewpoint disposed in a virtual space from a user; controlling a viewpoint to change the position and the direction of the viewpoint in response to the instruction; rendering a spatial image that depicts an aspect of an interior of the virtual space on a basis of the position and the direction of the viewpoint; and switching over between a first mode of changing the direction of the viewpoint about the position of the viewpoint and a second mode of changing the position and the direction of the viewpoint about an object of interest to which the user pays attention in the virtual space on a basis of a given condition in a case of receiving an instruction to change the direction of the viewpoint from the user at a time of controlling the viewpoint.

DETAILED DESCRIPTION OF THE PREFERRED EMBODIMENTS

Embodiments of the present technology will be described hereinafter with reference to the drawings.

Figure 1:
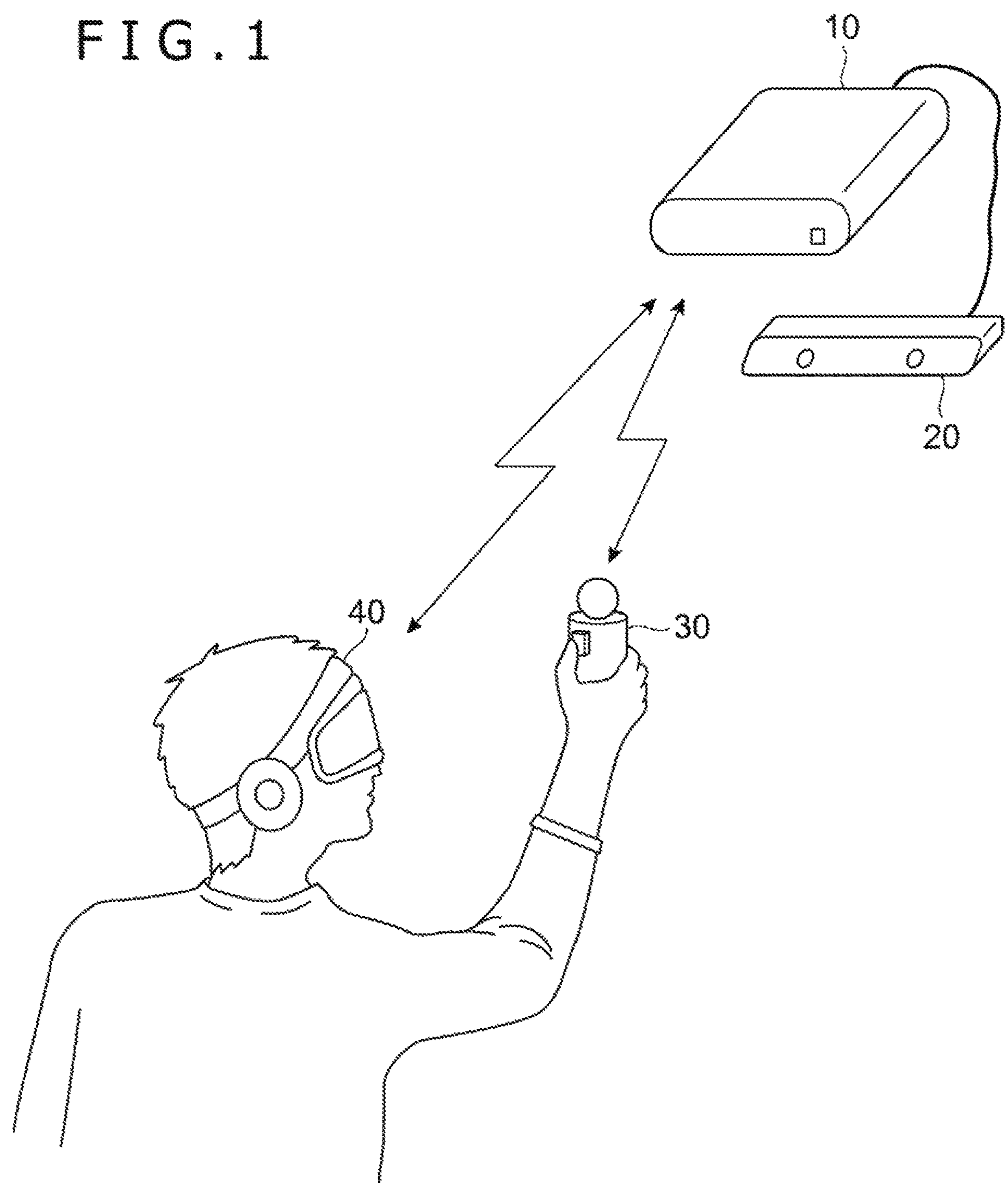
FIG. 1 is an overall schematic diagram of a video display system including an information processing apparatus according to an embodiment of the present technology.
Figure 2:
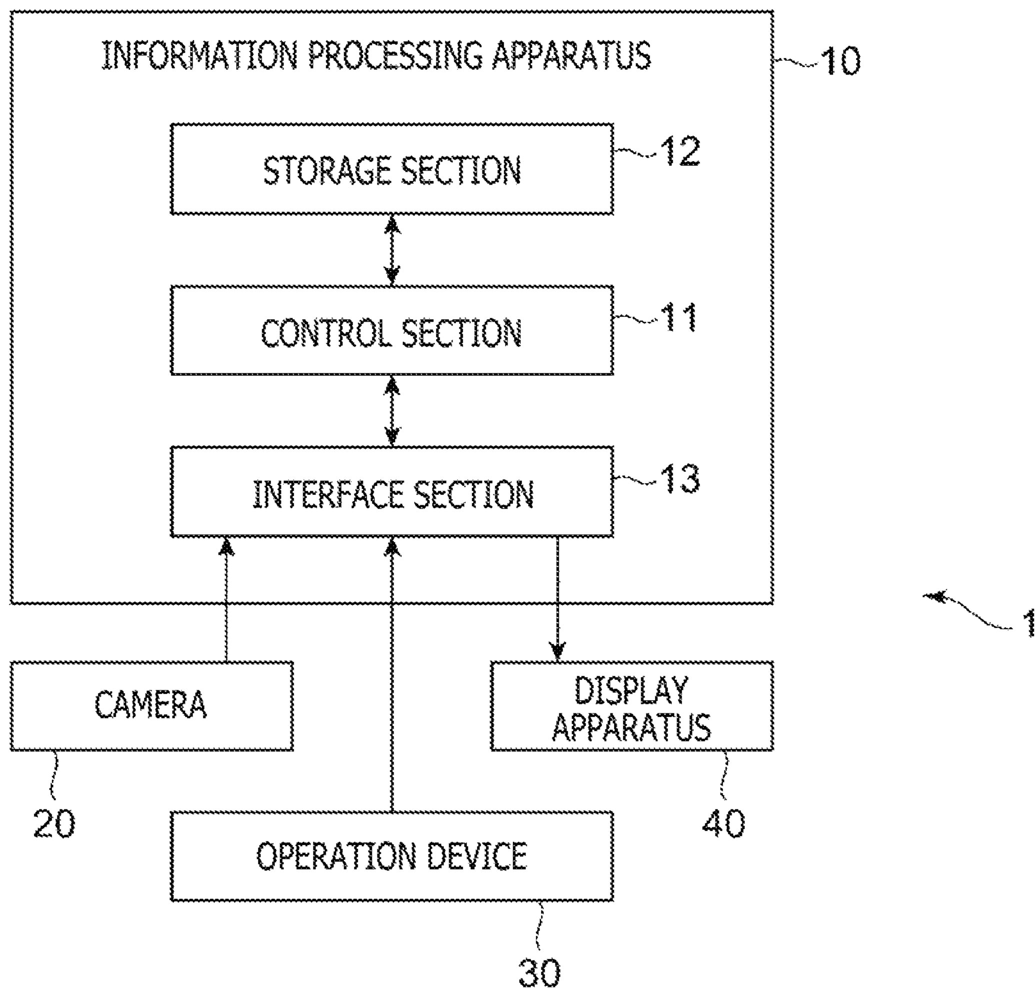
FIG. 2 is a configuration block diagram of the video display system.

FIG. 1 is an overall schematic diagram of a video display system 1 including an information processing apparatus 10 according to an embodiment of the present technology. Further, FIG. 2 is a configuration block diagram depicting a configuration of the video display system 1. As depicted in FIGS. 1 and 2, the video display system 1 includes the information processing apparatus 10, a camera 20, an operation device 30, and a display apparatus 40.

The information processing apparatus 10 is an apparatus that supplies a video to be displayed by the display apparatus 40, and may be, for example, a home video game machine, a portable video game machine, a personal computer, a smartphone, or a tablet. As depicted in FIG. 2, the information processing apparatus 10 includes a control section 11, a storage section 12, and an interface section 13.

The control section 11, which is a central processing unit (CPU) or the like, executes a program stored in the storage section 12 and executes various information processes. It is noted that specific examples of the processes executed by the control section 11 in the present embodiment will be described later. The storage section 12, which includes a memory device such as a random access memory (RAM), stores the program executed by the control section 11 and data processed by the program.

The interface section 13 is an interface for data communication of the information processing apparatus 10 with the camera 20, the operation device 30, and the display apparatus 40. The information processing apparatus 10 is connected to the camera 20, the operation device 30, and the display apparatus 40 via the interface section 13 by either wired or wireless connection. Specifically, the interface section 13 is assumed to include a multimedia interface such as a high-definition multimedia interface (HDMI) (registered trademark) for transmitting a video and a sound supplied from the information processing apparatus 10 to the display apparatus 40. Further, the interface section 13 includes a data communication interface such as a universal serial bus (USB) for receiving video data captured by the camera 20 and a signal indicative of a contents of a user's operation input to the operation device 30.

The camera 20, which is installed in front of a user who uses the video display system 1, captures a video containing the user and a periphery of the user. Particularly in the present embodiment, the camera 20 is assumed as a stereo camera and includes two imaging elements disposed to be apart from each other at a predetermined distance. Analyzing a difference (parallax) between images simultaneously captured by the two imaging elements enables the information processing apparatus 10 to measure a distance to a substance present within a visual field of the camera 20. In other words, the camera 20 functions as a distance image sensor that can detect the distance to the substance present within the visual field of the camera 20. The information processing apparatus 10 identifies positions of the operation device 30 and the display apparatus 40 in a real space by analyzing images captured by the camera 20.

The operation device 30 is a device that receives an operation input from the user, and operation members such as operation buttons are disposed on a surface of the operation device 30. A user inputs an operation to any of the operation members by gripping the operation device 30 by hand or wearing the operation device 30 around a hand. The operation device 30 transmits an operation signal indicative of a content of the user's operation input to the information processing apparatus 10.

Furthermore, the operation device 30 in the present embodiment is provided with a light-emitting section and configured to emit light from the light-emitting section. Imaging the light from this light-emitting section by the camera 20 enables the information processing apparatus 10 to identify the position of the operation device 30 in the real space.

The display apparatus 40, which is a video display apparatus used by user's wearing the display apparatus 40 on the head, displays a video in response to a video signal transmitted from the information processing apparatus 10 and allows the user to view the video. In the present embodiment, the display apparatus 40 is capable of ensuring that the user views the video with both eyes and is assumed to display videos in front of user's right and left eyes independently of each other. The display apparatus 40 can thereby present the user with a stereoscopic vision using the parallax.

It is also assumed that a light-emitting section is provided on a front surface of the display apparatus 40 similarly to the operation device 30. Imaging light from this light-emitting section by the camera 20 enables the information processing apparatus 10 to identify the position of the display apparatus 40 in the real space. Particularly in the present embodiment, a plurality of light-emitting sections are provided in the front surface of the display apparatus 40 and identifying a position relationship between these light-emitting sections enables the information processing apparatus 10 to identify a change in a posture of the display apparatus 40. The information processing apparatus 10 can thereby identify a change in a direction of a user's face when the user moves the user's head to change the direction of the face.

Figure 3:
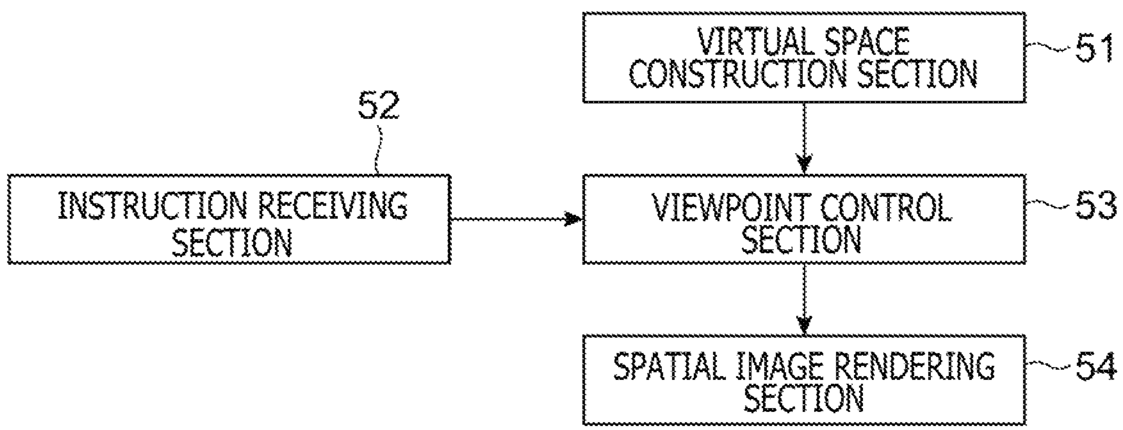
FIG. 3 is a functional block diagram of the information processing apparatus.

Functions realized by the information processing apparatus 10 will next be described with reference to FIG. 3. As depicted in FIG. 3, the information processing apparatus 10 functionally includes a virtual space construction section 51, an instruction receiving section 52, a viewpoint control section 53, and a spatial image rendering section 54. These functions are realized by causing the control section 11 to execute the program stored in the storage section 12. This program may be provided to the information processing apparatus 10 via a communication network such as the Internet or may be stored in a computer readable information recording medium such as an optical disk and provided to the information processing apparatus 10.

The virtual space construction section 51 constructs a virtual space in which various objects are disposed and controls behaviors of the objects disposed therein. It is assumed in the present embodiment that the information processing apparatus 10 realizes a game proceeding while the user observes and operates the various objects disposed in the virtual space. The virtual space construction section 51 disposes objects representing characters and goods appearing in this game. In addition, a viewpoint V that serves as a reference position at a time of rendering a spatial image, to be described later, is disposed in the virtual space. Furthermore, a visual line direction D is set to the viewpoint V.

The instruction receiving section 52 receives an instruction to change a position of the viewpoint V and the visual line direction D from the user. Particularly in the present embodiment, it is assumed that the user inputs an instruction to move the position of the viewpoint V in the virtual space and an instruction to change the visual line direction D each by operating one of predetermined buttons provided on the operation device 30. Specifically, the user issues a right turn instruction to change the visual line direction D rightward by depressing a predetermined first button on the operation device 30. Furthermore, the user issues a left turn instruction to change the visual line direction D leftward by depressing a predetermined second button. Moreover, the user issues a move-forward instruction to move the position of the viewpoint V forward by depressing a predetermined third button. The instruction receiving section 52 receives an operation signal indicative of each of contents of these instructions and inputs the operation signal to the viewpoint control section 53.

Furthermore, in the present embodiment, the user can give an operation input by moving the user's face or hand. Analyzing images captured by the camera 20 enables the instruction receiving section 52 to identify changes in the position and a direction of the display apparatus 40. It is supposed that an identified content corresponds to a motion of the user's face. Furthermore, analyzing the images captured by the camera 20 enables the instruction receiving section 52 to identify a change in the position of the operation device 30. It is supposed that the change in the position of the operation device 30 corresponds to a motion of the user's hand. These contents as well as a content of the operation input given to the operation device 30 are input to the viewpoint control section 53 and the virtual space construction section 51 as those representing contents of the user's instructions.

The viewpoint control section 53 changes the position of the viewpoint V and the visual line direction D in the virtual space in response to the contents of the instructions received by the instruction receiving section 52 from the user. Specifically, in a case in which the instruction receiving section 52 receives the left turn instruction or the right turn instruction, the viewpoint control section 53 executes control to change the visual line direction D (hereinafter, referred to as "turn control") in response to the content of the instruction. Furthermore, in a case in which the instruction receiving section 52 receives the move-forward instruction, the viewpoint control section 53 executes control to move the position of the viewpoint V from a current position to the visual line direction D (hereinafter, referred to as "move-forward control"). Specific contents of the turn control and the move-forward control will be described later.

Moreover, apart from the control in response to the operation input given to the operation device 30 such as the turn control or the move-forward control, the viewpoint control section 53 may change the position of the viewpoint V or the visual line direction D to correspond to the change in the position or the direction of the user's face. The user can thereby take a look around the user upward, downward, leftward, rightward, or the like with a state changed by the turn control or the move-forward control assumed as a reference state.

The spatial image rendering section 54 renders a spatial image that depicts an aspect of viewing an interior of the virtual space from the viewpoint V controlled by the viewpoint control section 53 to the visual line direction D, and outputs the spatial image to the display apparatus 40. Displaying this spatial image by the display apparatus 40 enables the user to see the aspect of viewing the interior of the virtual space from the viewpoint V moved in response to the user's instruction. It is assumed that the spatial image rendering section 54 renders two images depicting the aspect of viewing the interior of the virtual space from two viewpoint cameras arranged left and right about the position of the viewpoint V. The user can recognize the aspect of the interior of the virtual space in three dimensions by viewing these images with left and right eyes, respectively.

Details of the control over the position of the viewpoint V and the visual line direction D exercised by the viewpoint control section 53 will be described below.

The content of the move-forward control will first be described. For example, in a case in which the instruction receiving section 52 receives the move-forward instruction, the viewpoint control section 53 moves the position of the viewpoint V to the visual line direction D at timing of receiving the move-forward instruction. A movement amount in this case may be a predetermined amount.

Alternatively, the viewpoint control section 53 may move the position of the viewpoint V to any of candidate positions P set in a plurality of locations in the virtual space in advance. In this case, the viewpoint control section 53 sets the candidate position P, which is estimated as a position to which the user is to move the position of the viewpoint V at the timing of receiving the move-forward instruction, among a plurality of candidate positions P present in a predetermined range forward of the viewpoint V as a target position Px, and moves the position of the viewpoint V to the position Px.

Figure 4:
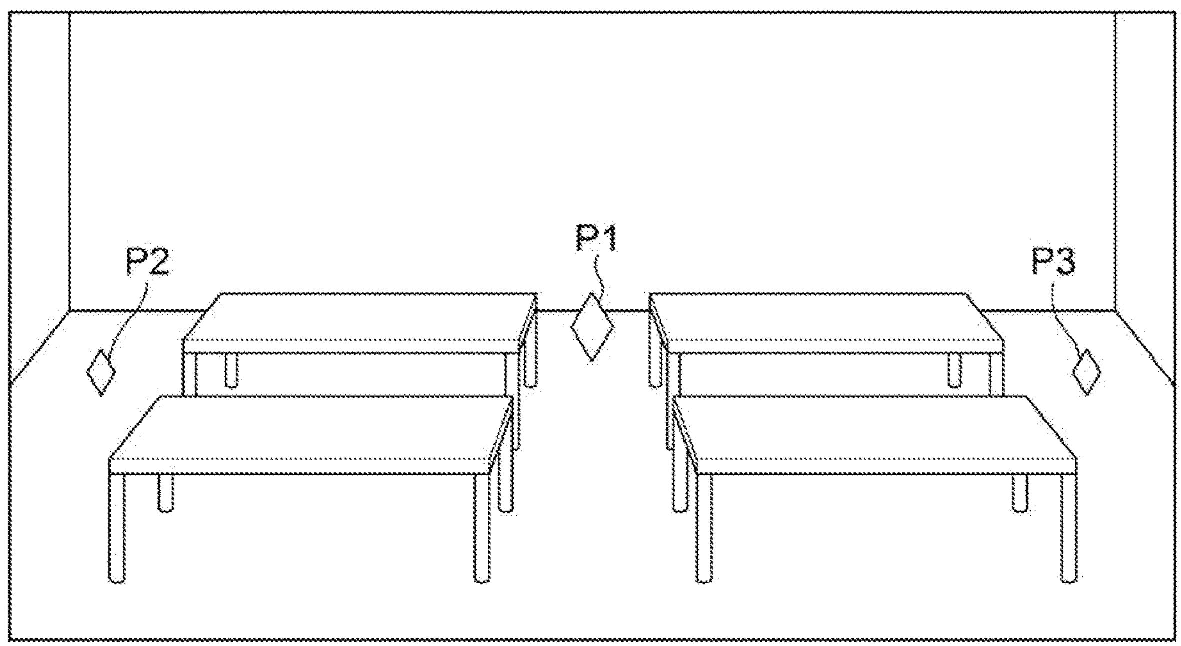
FIG. 4 depicts an example of a spatial image containing candidate positions.

The target position Px in this example may be, for example, the position closer to the viewpoint V in the predetermined range along the visual line direction D. FIG. 4 depicts an example of a spatial image containing the plurality of candidate positions P. In this example, a plurality of candidate positions P1 to P3 are contained within the field of view of the user and markers representing these candidate positions P1 to P3 are displayed. When the user issues the move-forward instruction in a state of displaying such a spatial image, the viewpoint control section 53 selects the candidate position P1 closer to the visual line direction D (that is, closer to a center in the spatial image) from among the plurality of candidate positions P1 to P3 as the target position Px and moves the viewpoint V to the position P1. In FIG. 4, the marker representing the candidate position P1 possibly selected as the target position Px is displayed larger than those of the other candidate positions P2 and P3. Thus, the user can easily grasp where the viewpoint V is moved if inputting the move-forward instruction at this time. While it has been described herein that the marker representing the candidate position P1 possibly selected as the target position Px is displayed larger than those of the other candidate positions P2 and P3, a display method is not limited to this one. For example, a color or a brightness of the marker, or a very shape of the marker of the candidate position P1 may be changed from those of the other positions P2 and 3. The marker of the candidate position P1 possibly selected as the target position Px may be displayed in any of various manners in which the user can distinguish the marker from the other markers.

Alternatively, the viewpoint control section 53 may select the target position Px from among the plurality of candidate positions P on the basis of a user's instruction. The viewpoint control section 53 may select the target position Px from among the plurality of candidate positions P displayed in the spatial image by, for example, user's performing an explicit switchover operation on the operation device 30. In another alternative, the viewpoint control section 53 may select the target position Px by user's moving the very operation device 30 to point to any of the candidate positions P. In this case, the instruction receiving section 52 identifies the position of the operation device 30 in the real space at the timing of user's issuing the move-forward instruction. The viewpoint control section 53 identifies the candidate position P to which the operation device 30 points on the basis of the identified position and selects the identified candidate position P as the target position Px.

The contents of the turn control will next be described. The viewpoint control section 53 executes the turn control on the basis of one of two types of control modes (a first mode and a second mode) to be described below in a case in which the instruction receiving section 52 receives the left turn instruction or the right turn instruction.

It is assumed that in the first mode, the viewpoint control section 53 rotates the visual line direction D about the position of the viewpoint V. In other words, the viewpoint control section 53 may not change the position of the viewpoint V but rotate only the visual line direction D in an instructed direction. Specifically, in a case in which the instruction receiving section 52 receives the right turn instruction, the viewpoint control section 53 rotates the visual line direction D clockwise in a view from above so that the viewpoint V faces rightward when the user views the spatial image. In a case in which the instruction receiving section 52 receives the left turn instruction, the viewpoint control section 53 rotates the visual line direction D counterclockwise so that the viewpoint V faces leftward when the user views the spatial image.

Figure 5:
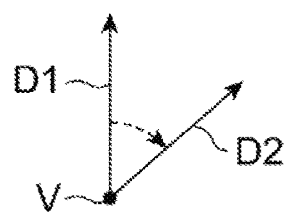
FIG. 5 is an illustrative diagram of a content of turn control in a first mode.
Figure 6:
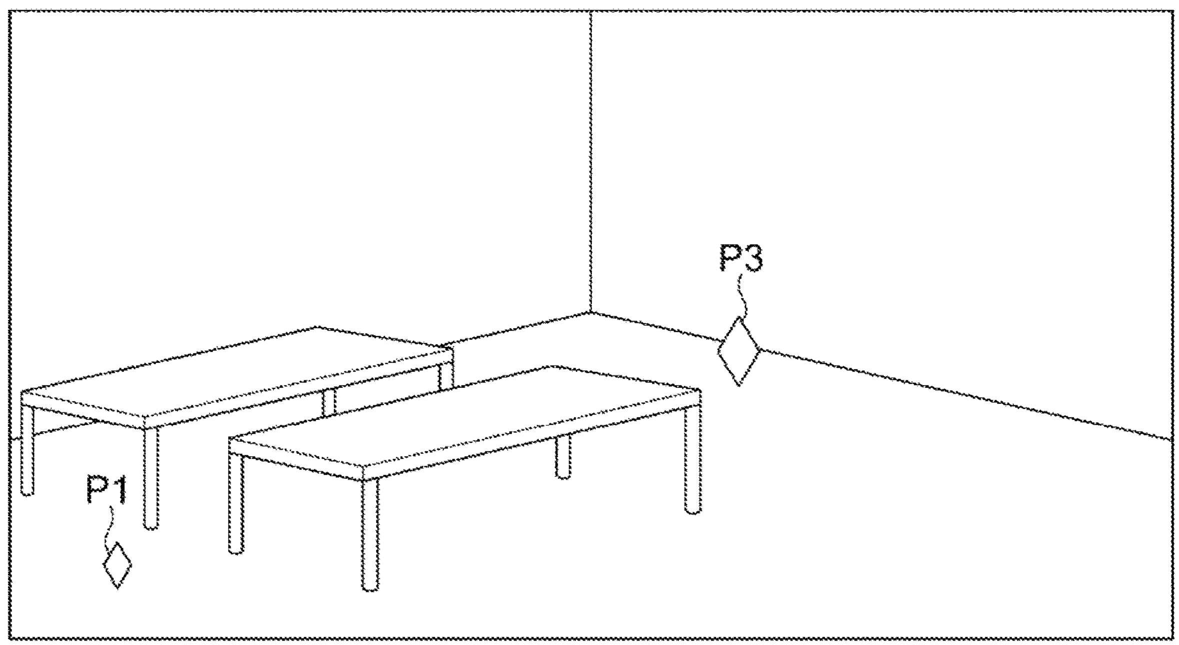
FIG. 6 depicts an example of a spatial image after the turn control in the first mode.

FIG. 5 illustrates the turn control over the visual line direction D in response to the right turn instruction in this first mode and depicts an aspect of viewing the viewpoint V from above. In FIG. 5, solid-line arrows denote a visual line direction D1 before turn and a visual line direction D2 after the turn, and a broken-line arrow denotes a rotation direction of the visual line direction D. While it is assumed herein that the visual line direction D is rotated 45 degrees when the left turn instruction is received once, an amount of this rotation is given as an example and the visual line direction D may be rotated by a rotation amount other than 45 degrees whenever the turning instruction is received. Alternatively, the rotation amount of the visual line direction D may be changed in response to an amount indicating a degree of an operation input executed by the user such as a strength or a time length of depressing the operation button at a time of user's issuing a turn instruction. FIG. 6 depicts an example of a spatial image after the right turn control in the first mode in a state in which the spatial image of FIG. 4 is displayed.

In the second mode, the viewpoint control section 53 rotates the visual line direction D about an object of interest Ox to which the user pays attention. In this mode, differently from the first mode, in a case in which the instruction receiving section 52 receives the right turn instruction or the left turn instruction, the viewpoint control section 53 changes not only the visual line direction D but also the position of the viewpoint V. It is noted that the object of interest Ox is a specific object which is disposed in the virtual space and to which the user is supposed to currently pay attention. It is assumed that the object possibly selected as the object of interest Ox (hereinafter, referred to as "candidate object O") is determined in advance. During the turn control in the second mode, the viewpoint control section 53 changes both the position of the viewpoint V and the visual line direction D so that the visual line direction D is constantly a direction of this object of interest Ox.

Figure 7:
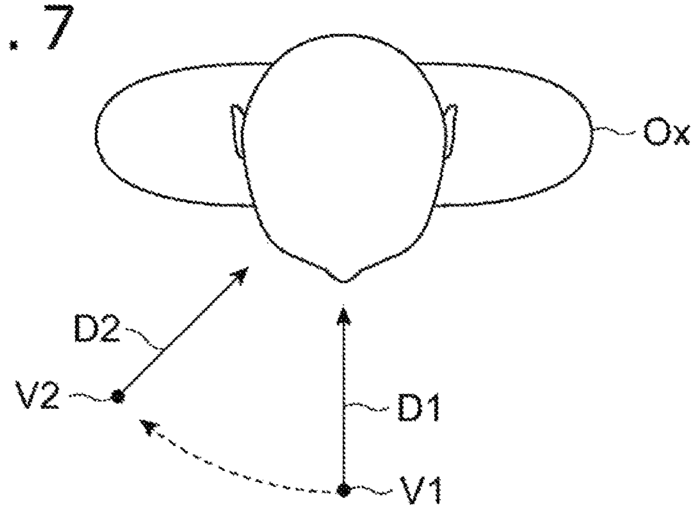
FIG. 7 is an illustrative diagram of a content of turn control in a second mode.

FIG. 7 illustrates the turn control over the visual line direction D in response to the right turn instruction in the second mode and depicts an aspect of viewing the viewpoint V from above similarly to FIG. 5. In FIG. 7, solid-line arrows denote a visual line direction D1 before turn and a visual line direction D2 after the turn similarly to FIG. 5, and points V1 and V2 denote a position of the viewpoint V before the turn and a position of the viewpoint V after the turn, respectively. In addition, a broken-line arrow denotes a moving direction of the viewpoint V by the turn control.

As depicted in FIG. 7, in the second mode, in response to the right turn instruction, the viewpoint control section 53 rotationally moves the position of the viewpoint V about the object of interest Ox clockwise in a view from above, and rotates the visual line direction D about the point of the viewpoint V clockwise so that the visual line direction D is the direction of the object of interest Ox in an interlocked fashion with the rotational movement of the viewpoint V. On the other hand, in a case in which the instruction receiving section 52 receives the left turn instruction in the second mode, the viewpoint control section 53 rotates the position of the viewpoint V counterclockwise about the object of interest Ox and rotates the visual line direction D counterclockwise about the point of the viewpoint V. It is noted that a rotation direction of the position of the viewpoint V and the visual line direction D may be an opposite direction to the direction described herein. Furthermore, while the rotation amount at a time of rotating the position of the viewpoint V and the visual line direction D in response to one turn instruction is preferably the same as the rotation amount of the visual line direction D in the first mode, the rotation amount may be different from the rotation amount in the first mode or may be changed depending on an identity of the current object of interest Ox.

Figure 8:
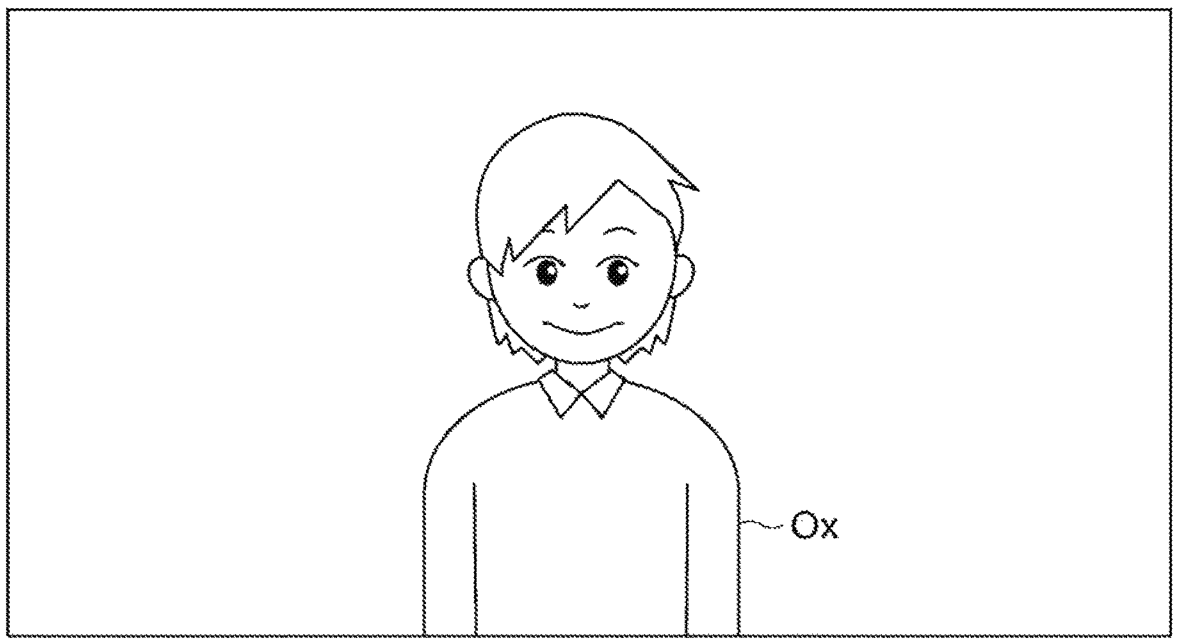
FIG. 8 depicts an example of a spatial image before the turn control in the second mode.
Figure 9:
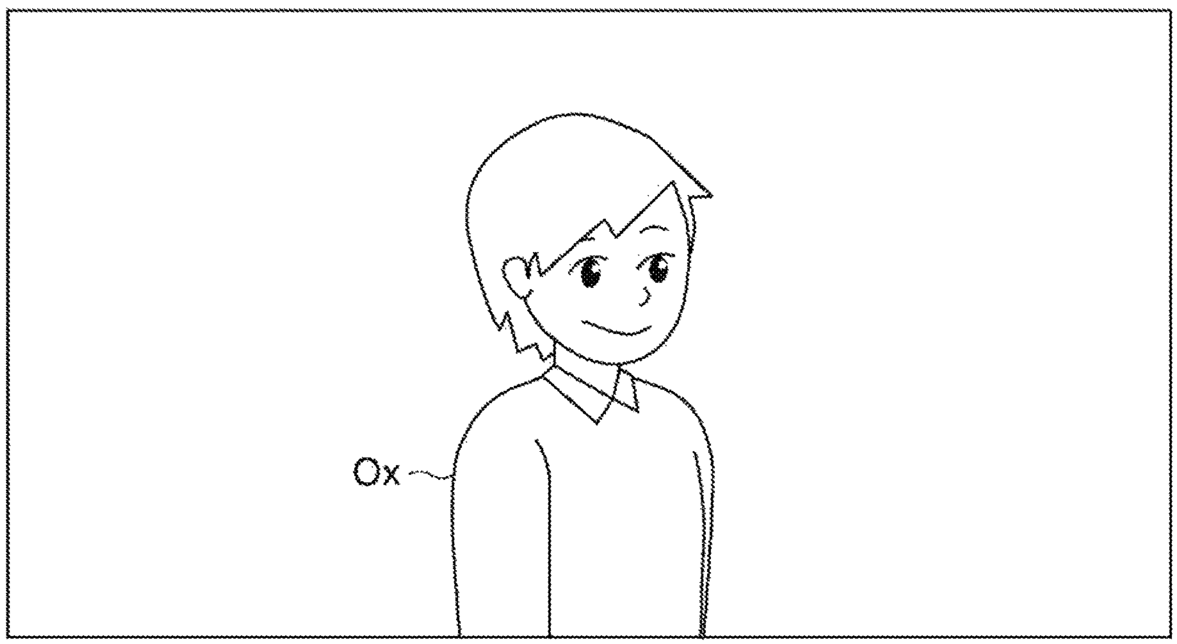
FIG. 9 depicts an example of a spatial image after the turn control in the second mode.

FIGS. 8 and 9 each depict an example of a spatial image in a case of exercising the turn control in the second mode. FIG. 8 depicts the example of the spatial image before the turn control is exercised, and FIG. 9 depicts the example of the spatial image after the right turn control is exercised in a state in which the spatial image depicted in FIG. 8 is displayed. As depicted in FIGS. 8 and 9, in the second mode, the object of interest Ox representing a female character is displayed in the vicinity of a center of the spatial image both before and after the turn control.

In this way, in the second mode, the viewpoint control section 53 rotates the position of the viewpoint V and the visual line direction D about the object of interest Ox in an interlocked fashion. Therefore, the object of interest Ox is constantly present generally in front of the viewpoint V even in the case of turning the visual line direction D similarly to the first mode, that is, exercising the turn control. Thus, the object of interest Ox is constantly contained in the spatial image rendered by the spatial image rendering section 54, so that it is possible to prevent the user from losing track of the object of interest Ox.

It is assumed that a route on which the position of the viewpoint V is moved by the turn control in the second mode is set in advance for each candidate object O. While it has been described in the example of FIG. 7 that the moving route of the position of the viewpoint V is a circle about the candidate object O, a radius of this circle may be determined in advance depending on a magnitude of the candidate object O. Furthermore, a shape of the moving route of the position of the viewpoint V may be other than a circular shape such as an elliptical shape, depending on a shape of the candidate object O. Moreover, the moving route of the position of the viewpoint V is not always a closed curve that entirely surrounds the candidate object O 360 degrees and may be a curve of a shape, for example, a semicircular shape, covering an angular range that is part of a periphery of the candidate object O.

The viewpoint control section 53 may execute switchover between the first mode and the second mode described so far on the basis of any of various conditions. For example, the viewpoint control section 53 may switch over between the first mode and the second mode in a case in which the user operates the operation device 30 to issue a predetermined switchover instruction.

Furthermore, the viewpoint control section 53 may switch over between the first mode and the second mode in response to a position relationship between the candidate object O and the viewpoint V. Specifically, it is assumed, for example, that the viewpoint control section 53 switches over the first mode to the second mode in a case in which the instruction receiving section 52 receives from the user the move-forward instruction to move the position of the viewpoint V so that the position of the viewpoint V comes close to the candidate object O. As described above, in a case of exercising the move-forward control over the position of the viewpoint V so that the candidate position P becomes a moving destination, the periphery of the candidate object O may be set as the candidate position P. In a case in which the user issues the move-forward instruction to move the position of the viewpoint V to the candidate position P set to the periphery of the candidate object O, it is assumed that the viewpoint control section 53 moves the position of the viewpoint V to the periphery of the candidate object O and switches over the control mode for the turn control from the first mode to the second mode. With such switchover, when the position of the viewpoint V of the user comes close to the candidate object O, the user can set this candidate object O as the object of interest Ox and observe an outward appearance of the object of interest Ox while changing the direction of the viewpoint V.

Figure 10:
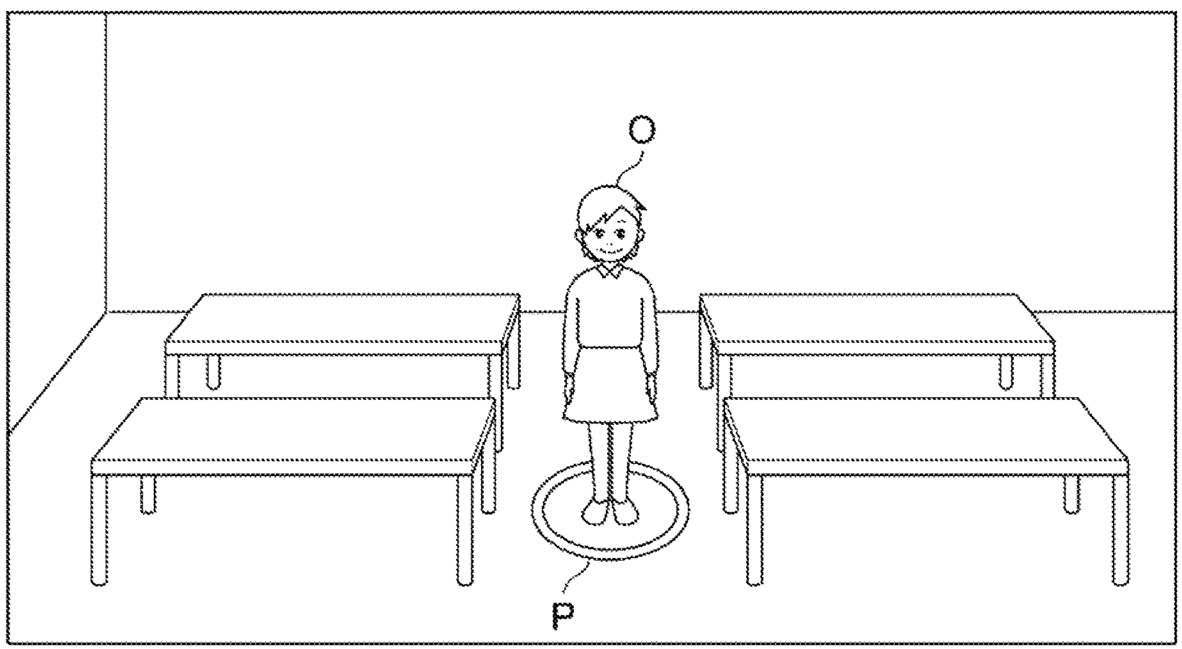
FIG. 10 depicts an example of a spatial image containing a candidate object.

FIG. 10 depicts a display example of a spatial image in a case in which the periphery of the candidate object O is the candidate position P. In the example of FIG. 10, the candidate object O representing a female character is displayed in the spatial image, and a marker of the candidate position P is depicted in such a manner as to surround the periphery of the candidate object O. In a case of user's issuing the move-forward instruction in this state, then the viewpoint control section 53 moves the position of the viewpoint V to the candidate position P close to the candidate object O, the candidate object O is displayed as the object of interest Ox generally at the center of the spatial image as depicted in FIG. 8, and the viewpoint control section 53 switches over the control mode to the second mode.

In the example of FIG. 10, the marker of the candidate position P has a circular shape different from the shape of the candidate position P exemplarily depicted in FIG. 4. In other words, the spatial image rendering section 54 renders the spatial image in such a manner that the user can distinguish the candidate object O possibly selected as the object of interest Ox from the other objects. The user can thereby easily grasp occurrence of switchover from the first mode to the second mode in a case of moving the position of the viewpoint V to come close to this candidate object O.

Furthermore, the marker of the candidate position P in FIG. 10 indicates the moving route of the position of the viewpoint V in response to the turn control after switchover to the second mode. The user can thereby easily grasp how to move the position of the viewpoint V in a case of issuing the turn instruction after the move-forward and switchover to the second mode.

In this example, an operation content of the move-forward instruction may vary depending on whether or not switchover of the turn control mode is performed after movement. For example, it has been described so far that the move-forward instruction is an operation of depressing the third button disposed on the surface of the operation device 30. The move-forward instruction may be the operation described above in a case of moving the position of the viewpoint V to the normal target position Px. However, in a case in which the target position Px is a peripheral position of the candidate object O and switchover to the second mode occurs after movement, the instruction receiving section 52 may receive an operation input of depressing and holding the same third button for predetermined time or longer as the move-forward instruction. This can prevent the position of the viewpoint V from being moved close to the candidate object O without user's awareness of the occurrence of switchover to the second mode and prevent unintended turn control from being exercised.

Furthermore, the viewpoint control section 53 may reproduce different sound effects or display different screen effects between a case in which switchover to the second mode occurs and a case in which switchover does not occur at the time of exercising the move-forward control. This can clearly notice the user of the occurrence of switchover to the second mode at the time of moving the position of the viewpoint V. Moreover, after switchover to the second mode, the viewpoint control section 53 may change the visual line direction D in a manner different from that of the first mode (such as reproducing different sound effects or displaying screen effects) whenever exercising the turn control. This enables the user to easily grasp whether the turn control is currently exercised in the first mode or the second mode.

Furthermore, in this example, it is assumed that in a case in which the user issues the move-forward instruction by moving the user's head to point the visual line direction D to the candidate position P in a location apart from the object of interest Ox during execution of the turn control in the second mode, the viewpoint control section 53 moves the position of the viewpoint V to the candidate position P and switches over the control mode for the turn control from the second mode to the first mode. This enables the user to move the position of the viewpoint V to a different position by the same method as a viewpoint control method exercised before and to switch over the second mode to the first mode.

On the other hand, in a case in which the user can continuously move the position of the viewpoint V irrespectively of the candidate positions P and in which the position of the viewpoint V comes close to the candidate object O until a distance to the candidate object O becomes smaller than the predetermined threshold, the viewpoint control section 53 may switch over the first mode to the second mode. This enables automatic switchover to the second mode irrespective of a user's explicit instruction in a case in which it is supposed that the user pays attention to the candidate object O. In this case, the viewpoint control section 53 may switch over the first mode to the second mode in a case in which a condition that the visual line direction D is the direction of the candidate object O (that is, the candidate object O appears in a predetermined range containing the center of the spatial image) is satisfied in addition to a condition of the distance between the viewpoint V and the candidate object O. In this case, similarly to the above case, the user may be notified of the occurrence of switchover to the second mode by sound effects, screen effects, or the like. Furthermore, in this example, in a case in which the user issues an instruction to move the position of the viewpoint V and the viewpoint V is moved to a position apart from the candidate object O, the viewpoint control section 53 may switch over the second mode to the first mode.

As described so far, the information processing apparatus 10 according to the present embodiment switches over between the first mode of turning the visual line direction D about the point of the viewpoint V and the second mode of turning the visual line direction D about the object of interest Ox depending on the given condition. It is thereby possible to change the visual line direction D by the operation input identical to the operation input for normally changing the visual line direction D in the virtual space while preventing the user from losing track of the object of interest Ox when the user pays attention to the object of interest Ox.

It is noted that embodiments of the present technology are not limited the embodiment described so far. For example, it has been described above that the operation of issuing the instruction to change the position of the viewpoint V or the visual line direction D is the operation of depressing any of the operation buttons provided on the operation device 30; however, the operation may be any of various other operations. Furthermore, the operation is not limited to the operation on any of the operation members disposed on the surface of the operation device 30 but may be any of various operations such as a gesture operation by a hand or finger motion. Moreover, the contents of the instructions received by the instruction receiving section 52 from the user are not limited to the turn instructions and the move-forward instruction but may include various instructions to change the position and the direction of the viewpoint.

Furthermore, it has been described above that the information processing apparatus 10 identifies the changes in the positions of the operation device 30 and the display apparatus 40 by the images captured by the cameras 20. However, the present technology is not limited to this implementation. For example, the information processing apparatus 10 may detect the motion of the user's face or hand by various methods such as use of detection results of motion sensors incorporated in the operation device 30 and the display apparatus 40.

Moreover, it has been described above that the spatial image that depict the aspect of the interior of the virtual space is displayed on the display apparatus 40 worn on the head by the user. However, the display apparatus that displays the spatial image is not limited to this type but may be a conventional stationary display apparatus.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-092245 filed in the Japan Patent Office on May 11, 2018(H30), the entire content of which is hereby incorporated by reference.

What is claimed is:

1. A non-transitory computer readable medium having stored thereon a program for a computer, the program comprising:

receiving an instruction to change a position and a direction of a viewpoint disposed in a virtual space from a user;

controlling a viewpoint to change the position and the direction of the viewpoint in response to the instruction;

rendering a spatial image that depicts an aspect of an interior of the virtual space on a basis of the position and the direction of the viewpoint; and switching over between a first mode of changing the direction of the viewpoint about the position of the viewpoint and a second mode of changing the position and the direction of the viewpoint about an object of interest to which the user pays attention in the virtual space on a basis of a given condition in a case of receiving an instruction to change the direction of the viewpoint from the user at a time of controlling the viewpoint, wherein the rendering step includes displaying the candidate object of the object of interest in such a manner as to be distinguishable from the other objects by rendering a marker on a periphery of the candidate object, and wherein the marker indicates a route on which the position of the viewpoint is moved at a time of changing the position and the direction of the viewpoint about the object of interest in the second mode.

2. The non-transitory computer readable medium according to claim 1, wherein the switchover step includes switching over between the first mode and the second mode in response to a position relationship between the object of interest and the viewpoint.

3. The non-transitory computer readable medium according to claim 2, wherein the switchover step includes switching over the first mode to the second mode in a case of receiving an instruction to move the viewpoint so that the viewpoint comes close to the object of interest.

4. The non-transitory computer readable medium according to claim 2, wherein the switchover step includes switching over the first mode to the second mode in a case in which a distance between the object of interest and the viewpoint becomes smaller than a predetermined threshold.

5. The non-transitory computer readable medium according to claim 3, wherein the rendering step includes rendering a spatial image that displays a candidate object of the object of interest in such a manner as to be distinguishable from other objects.

6. An information processing apparatus comprising:

an instruction receiving section that receives an instruction to change a position and a direction of a viewpoint disposed in a virtual space from a user;

a viewpoint control section that changes the position and the direction of the viewpoint in response to the instruction; and a spatial image rendering section that renders a spatial image that depicts an aspect of an interior of the virtual space on a basis of the position and the direction of the viewpoint, wherein the viewpoint control section switches over between a first mode of changing the direction of the viewpoint about the position of the viewpoint and a second mode of changing the position and the direction of the viewpoint about an object of interest to which the user pays attention in the virtual space on the basis of a given condition in a case in which the instruction receiving section receives an instruction to change the direction of the viewpoint from the user, wherein the spatial image rendering section displays the candidate object of the object of interest in such a manner as to be distinguishable from the other objects by rendering a marker on a periphery of the candidate object, and wherein the marker indicates a route on which the position of the viewpoint is moved at a time of changing the position and the direction of the viewpoint about the object of interest in the second mode.

7. An information processing method comprising:

receiving an instruction to change a position and a direction of a viewpoint disposed in a virtual space from a user;

controlling a viewpoint to change the position and the direction of the viewpoint in response to the instruction;

rendering a spatial image that depicts an aspect of an interior of the virtual space on a basis of the position and the direction of the viewpoint; and switching over between a first mode of changing the direction of the viewpoint about the position of the viewpoint and a second mode of changing the position and the direction of the viewpoint about an object of interest to which the user pays attention in the virtual space on a basis of a given condition in a case of receiving an instruction to change the direction of the viewpoint from the user at a time of controlling the viewpoint, wherein the rendering step includes displaying the candidate object of the object of interest in such a manner as to be distinguishable from the other objects by rendering a marker on a periphery of the candidate object, and wherein the marker indicates a route on which the position of the viewpoint is moved at a time of changing the position and the direction of the viewpoint about the object of interest in the second mode.

* * * * *